(No Model.)  6 Sheets—Sheet 1.

F. H. RICHARDS.
WEIGHING MACHINE.

No. 570,298.  Patented Oct. 27, 1896.

Witnesses:
R. W. Pittman
Fred. J. Dole.

Inventor:
F. H. Richards (No Model.) 6 Sheets—Sheet 2.
F. H. RICHARDS.
WEIGHING MACHINE.
No. 570,298. Patented Oct. 27, 1896.
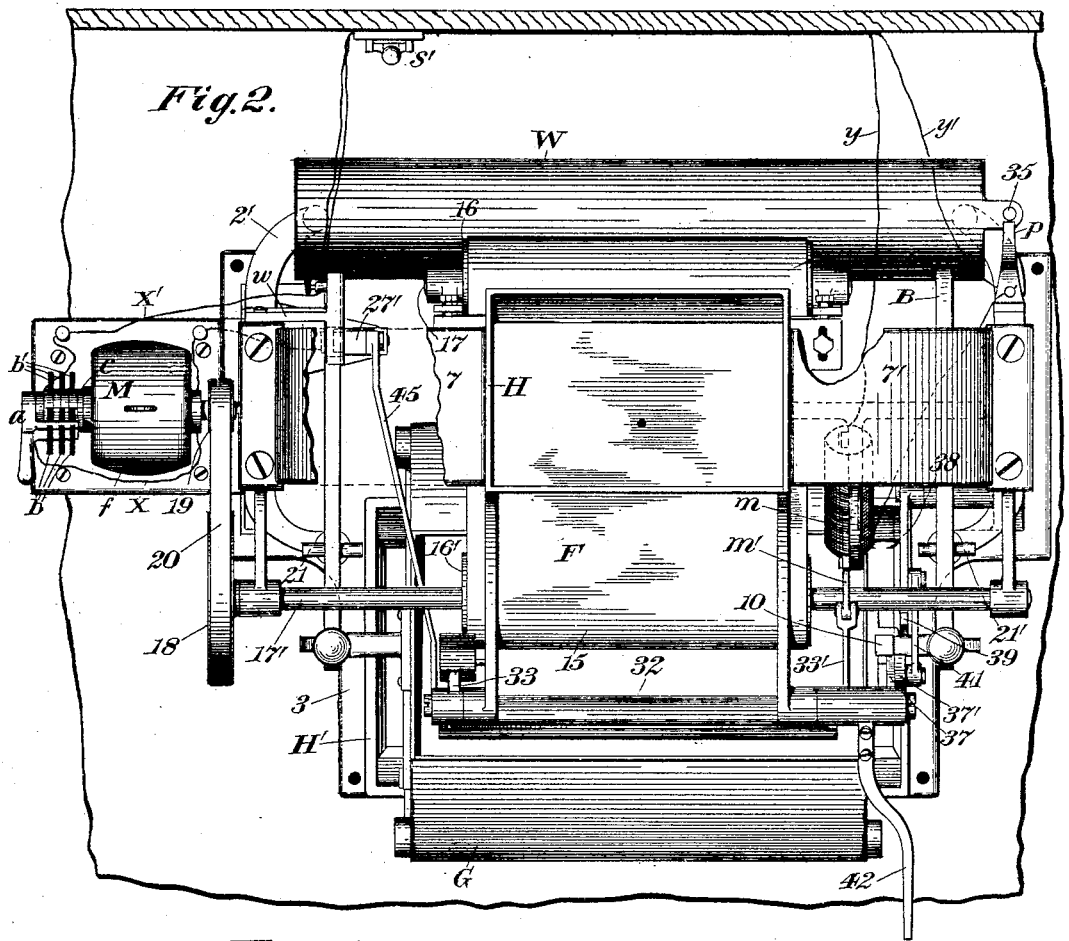
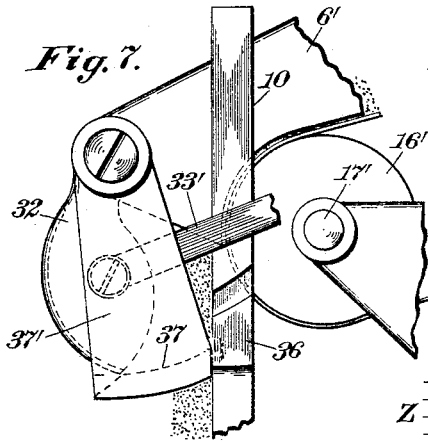
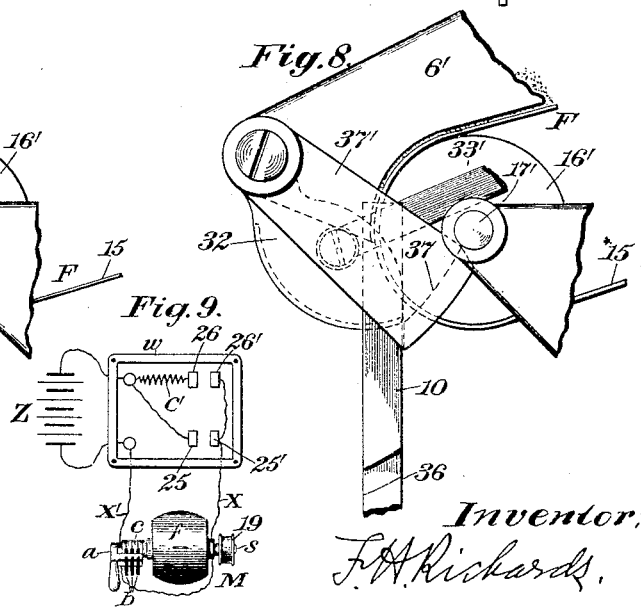
Witnesses:
R. W. Pittman
Fred. J. Dole
Inventor:
F. H. Richards (No Model.) 6 Sheets—Sheet 3.

F. H. RICHARDS.
WEIGHING MACHINE.

No. 570,298. Patented Oct. 27, 1896.

Witnesses:
R. W. Pitman
Fred. J. Dole.

Inventor:
F. H. Richards.

(No Model.)

F. H. RICHARDS.
WEIGHING MACHINE.

No. 570,298. Patented Oct. 27, 1896.

Witnesses:
R. W. Pittman
Fred. J. Dole.

Inventor
F. H. Richards.

(No Model.)  6 Sheets—Sheet 5.

F. H. RICHARDS.
WEIGHING MACHINE.

No. 570,298. Patented Oct. 27, 1896.

Witnesses:
R. W. Pittman
Fred. J. Dole.

Inventor:
F. H. Richards (No Model.)

F. H. RICHARDS.
WEIGHING MACHINE.

No. 570,298.  Patented Oct. 27, 1896.

6 Sheets—Sheet 6.

Witnesses:
R. W. Pittman
Fred. J. Dole.

Inventor:
F. H. Richards.

United States Patent Office.

FRANCIS H. RICHARDS, OF HARTFORD, CONNECTICUT.

WEIGHING-MACHINE.

SPECIFICATION forming part of Letters Patent No. 570,298, dated October 27, 1896.

Application filed June 22, 1896. Serial No. 596,395. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, an object of the invention being to provide an improved organization of mechanism comprehending a feeder, an electric motor for driving the same, and automatically-operated means for regulating the strength of the current supplied to said motor, whereby its velocity will be varied and that of the feeder correspondingly changed.

A further object of the invention resides in the provision of means operative with the weighing mechanism for shunting a portion of the electrical current or force to a solenoid or analogous magnet for energizing the same, the latter being adapted to actuate a valve which catches the drizzle or spray that drops from the feeder on the reduction of speed or stoppage thereof.

Figure 1:
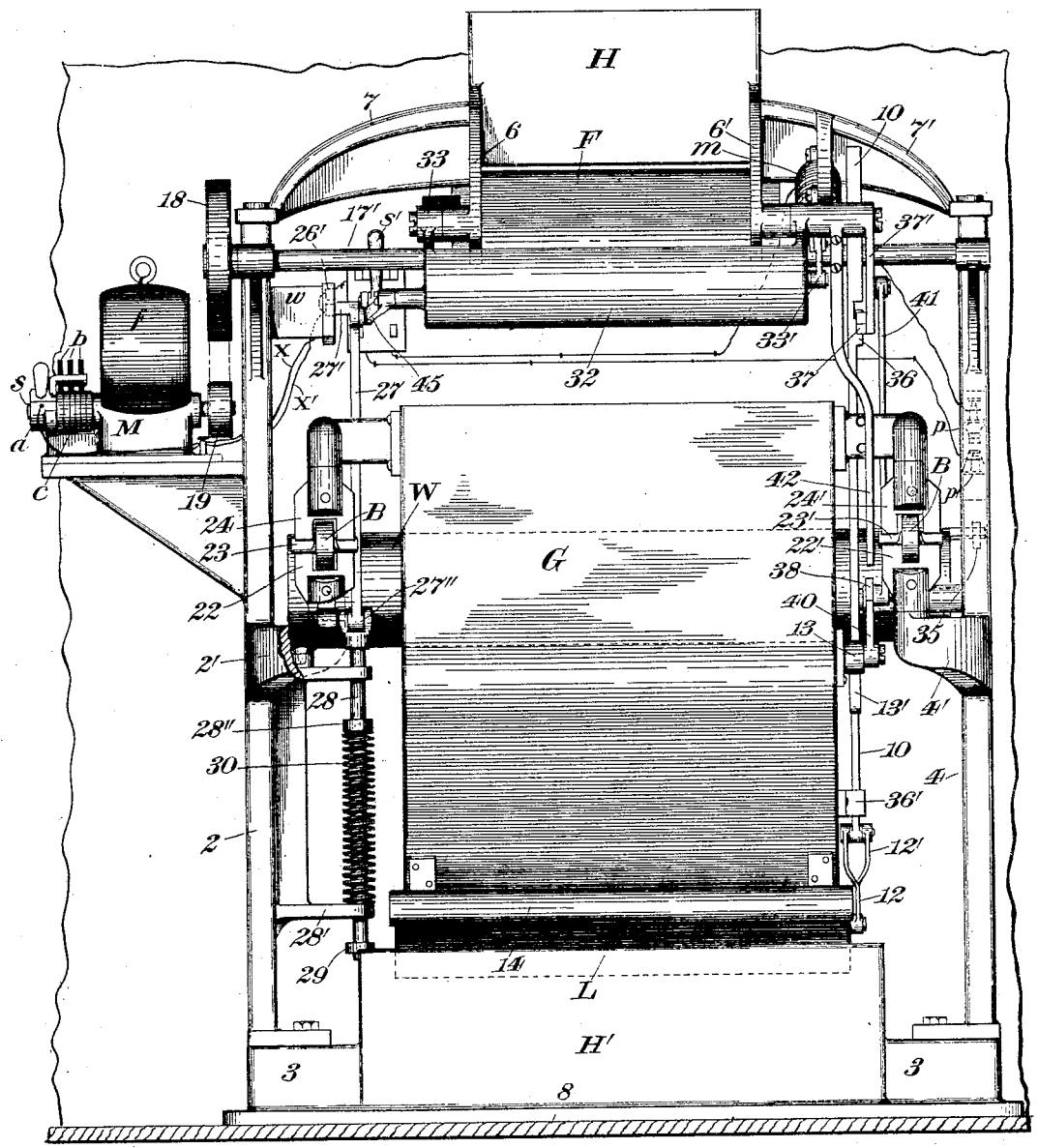
Figure 3:
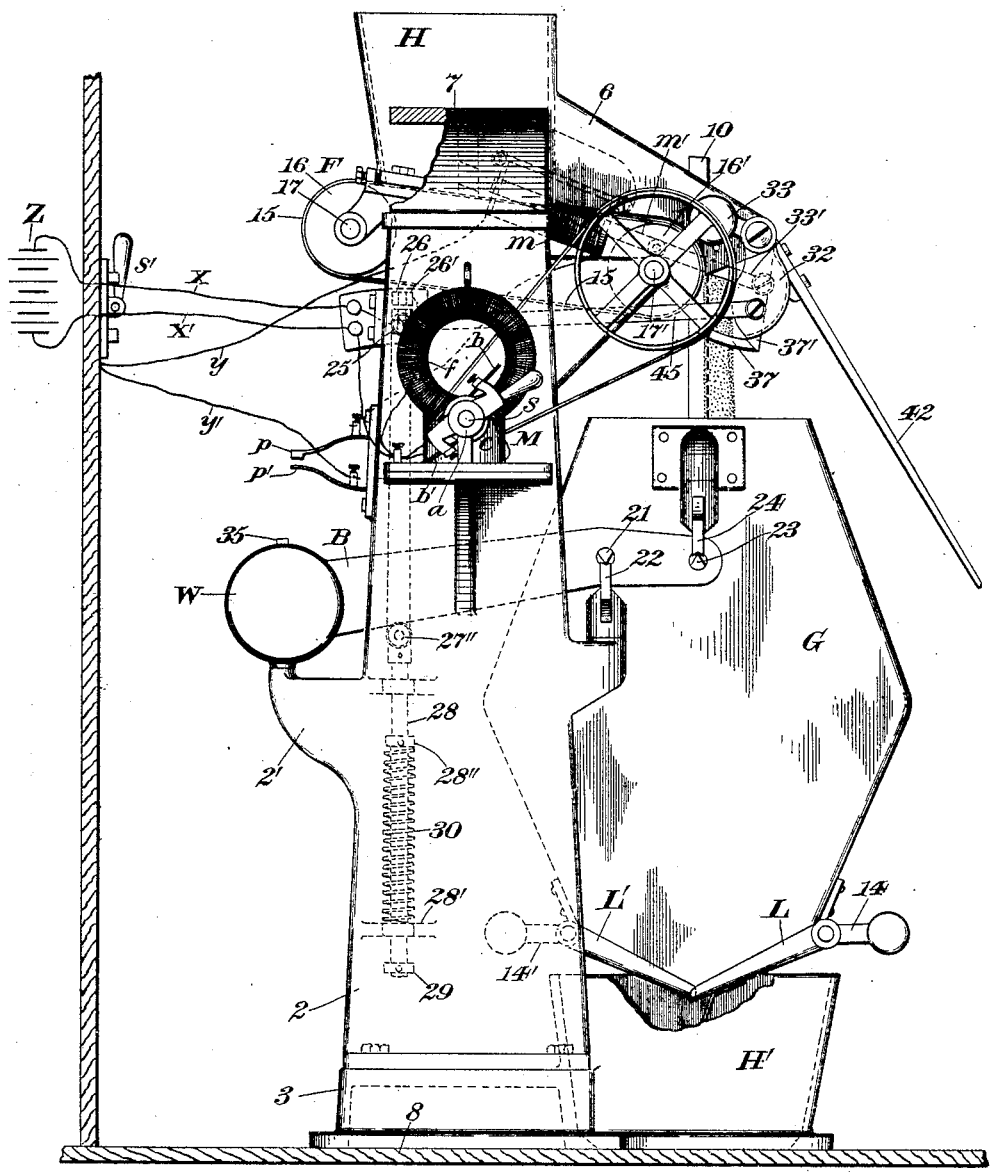
Figure 4:
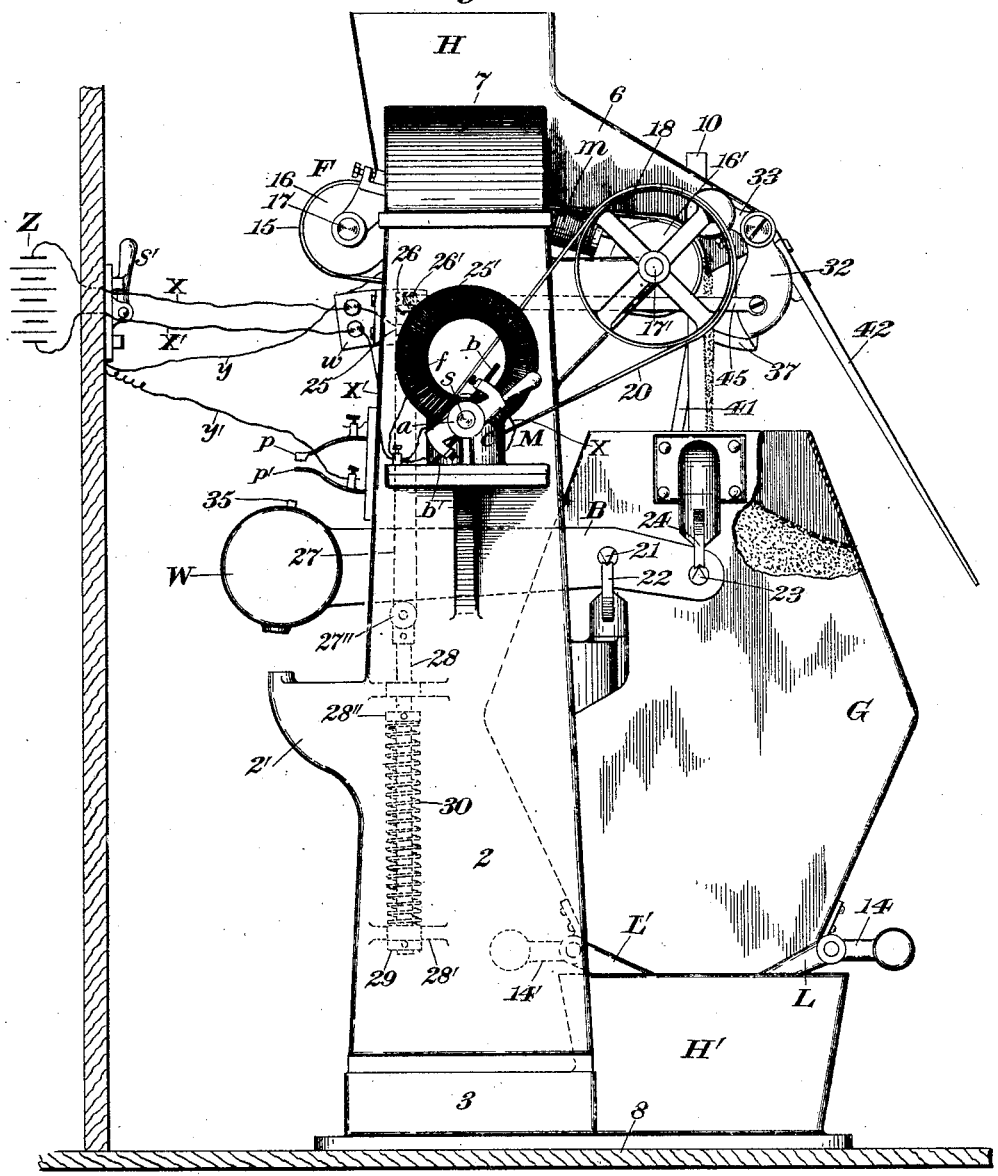
Figure 5:
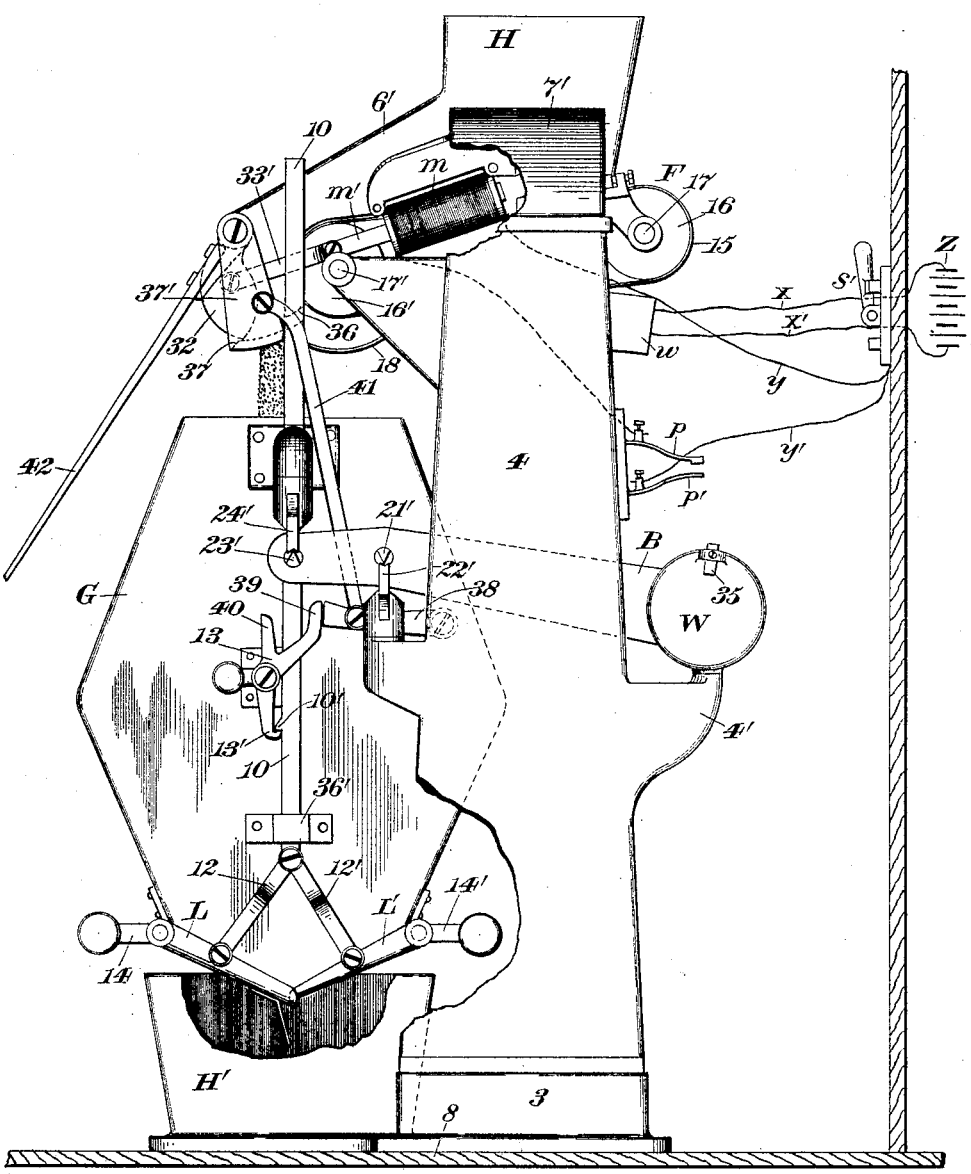
Figure 6:
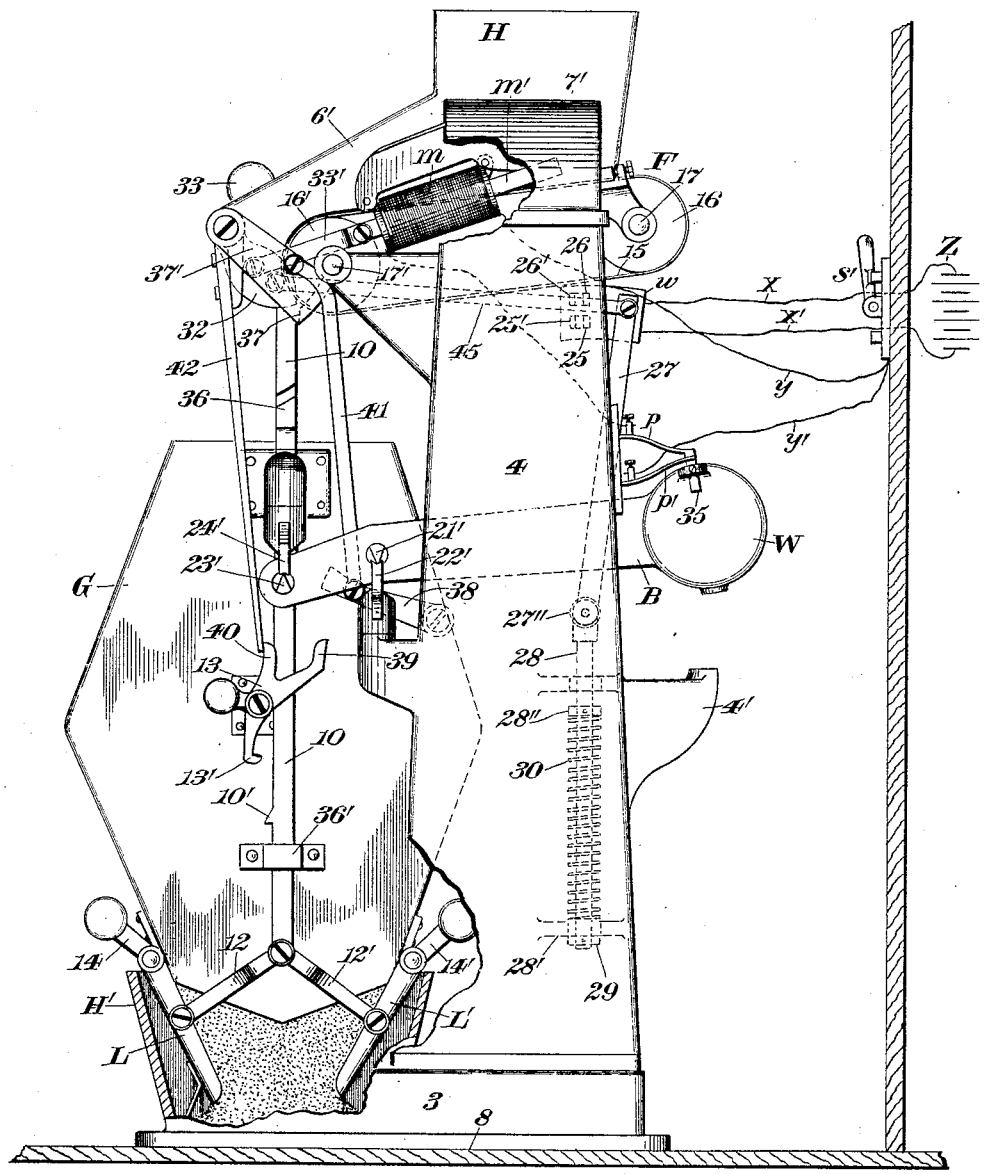

In the drawings accompanying and forming part of the specification, Figure 1 is a front elevation of a weighing-machine comprehending my improvements in the preferred embodiment thereof. Fig. 2 is a plan view of the machine, with parts broken away more clearly to illustrate certain peculiar features of construction. Fig. 3 is an end elevation of the machine as seen from the left in Fig. 1, the parts being in positions corresponding with those in said figure. Fig. 4 is a view similar to Fig. 3, showing the parts in the positions they occupy at the commencement of the poising period. Fig. 5 is an end elevation as seen from the right in Fig. 1, the parts being in positions corresponding therewith. Fig. 6 illustrates the positions occupied by said parts during the load-discharge period. Figs. 7 and 8 are detail views hereinafter more particularly described; and Fig. 9 is a face view of the switch or rheostat box with its cover removed to illustrate the interior thereof, and also shows the connections with the motor and generator.

Similar characters designate like parts in all the figures of the drawings.

The framework for supporting the operative parts of the machine may be of any suitable construction, and it is herein illustrated comprising the uprights or columns 2 and 4, mounted on the supporting-base 3 and connected thereto by suitable fastening means.

A chute or hopper is shown at H, it being of ordinary construction and having the extended end plates 6 and 6', which serve as guards and also as a convenient means for supporting a valve, as will hereinafter be set forth. The chute H is shown having the laterally-extending brackets 7 and 7' suitably fixed to the uprights 2 and 4, respectively.

The bucket or load-carrying receptacle of the machine is designated by G, and is of the "single-chambered" type or class, having its receiving opening or mouth in position to receive a stream of material from the chute or hopper H. The loads of material are intermittingly discharged into the hopper H', which may be formed integral with the base 3 of the machine, said hopper having an opening in its bottom which registers with a similar opening (not shown) formed in the floor 8.

For supporting the bucket G a counterweighted scale-beam B is illustrated, it comprising a pair of arms joined by the combined connecting-shaft and counterweight W. The beam-arms are provided with the knife-edges 21 and 21', resting on suitable bearings, as 22 and 22', connected to the side frames 2 and 4, or brackets thereon, and by which said scale-beam is pivotally mounted, its weight normally resting on brackets, as 2' and 4', extending from the side frames 2 and 4, respectively. The beam-arms adjacent to the inner ends thereof are furnished with knife-edges 23 and 23', which sustain suitable bearings, as 24 and 24', attached to the bucket G.

The closers for the bucket are designated by L and L', respectively, the last mentioned of which has its closing movement in advance of that of the other, so that said closer L may overlap its companion, as indicated in Fig. 5, whereby a tight joint is provided at this point. A relatively long rod is shown at 10, said rod having pivoted at its lower end the links 12 and 12', similarly attached to the closer L and L'. It will be evident that when said rod 10 is engaged by a suitable restraining device the opening of the closers L and L' will be prevented, and on the disengagement of said device the two closers L and L' will be freed of all restraint and may be forced open by the weight of the mass in the bucket, as indicated in Fig. 6. The rod 10 is shown having formed thereon the projection 10', which is positioned to be engaged by the hook 13' of the latch 13, said latch being pivoted on the bucket, and preferably provided with a counterweight for maintaining the hook 13' in engagement with the projection 10'. It will be evident that when these parts are disengaged the closers L and L' will be instantly forced open, as hereinbefore specified. For returning the closers L and L' to the shut or normal positions thereof they may be provided with counterweighted arms 14 and 14', preferably formed integral therewith.

For supplying the bucket G with a stream of material a feeder will be preferably employed, the feeder shown being designated by F, and consisting of the endless belt or apron 15, of leather, canvas, or other suitable material, passed around the supporting-rolls 16 and 16', the shafts 17 and 17' of which may be journaled in suitable brackets on the framing of the machine, the shaft 17' being shown connected with a motor.

The feeder F will have a variable speed, and in the form herein illustrated will have its greatest velocity at the commencement of operation of the machine, whereby it is operable for conveying or supplying a stream of relatively large volume to the bucket G, such stream constituting the main stream and furnishing the major part of the bucket load.

At a successive point in the operation of the machine, or when the bucket load is nearly complete, the speed of the feeder will be changed or reduced, the consequence being a like reduction in volume of the supply-stream, the attenuated stream constituting the drip-stream, and its purpose being to complete or top off the partial load in the bucket.

For driving or actuating the feeder F an electric motor located in an electric circuit is employed, it being designated by M, and being mechanically connected with said feeder for imparting a movement thereto and electrically connected with a suitable generator or source of electric force or power, as the batteries $z$, by which said motor may be operated on the supply of a current thereto.

The electric motor M being of well-known construction, it is deemed unnecessary to specifically describe the same. The field-magnet is designated by $f$, the commutator by $c$, the brushes by $b$ and $b'$, the armature by $a$, and the armature-shaft by $s$, said brushes being connected by the conductors or wires $x$ and $x'$ with an electrical generator, a switch, as $s'$, being located in the motor-circuit by which the current may be directed to the motor M and the same operated in the usual manner.

The shaft 17' of the feeder F will be operatively connected with the motor M, said shaft having keyed or otherwise connected thereto the pulley 18, the armature-shaft $s$, carrying a complemental pulley 19, connected by a belt 20 to the pulley 18, and by which on the movement of the armature-shaft $s$ the feeder F may be operated, as is apparent.

For effecting a variable speed of the feeder automatically-operated means will be employed for regulating the strength of the current supplied to the motor M, so that its speed will be thereby changed and the velocity of the feeder F likewise or correspondingly affected.

A switchboard or box is shown at $w$ located in the motor or main circuit, the electrical conductors or wires $x$ and $x'$ being connected to the posts thereof and to the motor M and also to the generator $z$, one of said wires passing through the switchboard.

The switchboard $w$ has the terminals 25 and 25' (see Fig. 4) and 26 and 26', (see Fig. 3,) the last-mentioned terminals being electrically connected with a rheostat or resistance-coil $c'$, preferably located within the switchboard or box $w$, and electrically connected with the batteries $z$.

For regulating the strength or intensity of the electric current supplied to the motor M an automatically-operating circuit-controller or switch is shown at 27, the action of which is preferably governed by some reciprocatory member of the weighing mechanism, as the scale-beam B. The circuit-controller or switch 27 consists of a flat bar having at the upper end thereof a bridge-piece or switch proper 27'. It will be apparent that when said bridge-piece 27' is in contact with the terminals 25 and 25' a current of relatively high amperage or intensity may flow through the wires $x$ and $x'$ and to the motor M, whereby the latter will be operated at a relatively high speed, the velocity of the feeder F being at its highest efficiency, so that the latter is operable for supplying a stream of relatively large volume from the chute or hopper H to the bucket G. It will be likewise apparent that when said bridge-piece 27' bridges the terminals 26 and 26', which, it will be remembered, are in electrical connection with a resistance, the result will be a diminution in speed of the motor M and a corresponding reduction in velocity of the feeder F, so that it is operable for feeding a relatively fine or drip stream into the bucket G. When the bridge-piece is thrown out of contact with the terminals 26 and 26', the electrical current to the motor M will be cut off, said motor, and hence the feeder, being thereby stopped or thrown out of action.

The switch 27 is shown pivoted at its lower end to the bar or rod 28, which passes through suitable guide-brackets formed on the inner face of the side frame 2, it being evident that by virtue of the pivotal connection of the switch 27 to the rod or bar 28 said switch may have free lateral movement for breaking the motor-circuit. The bar 28 has attached to its lower end the stop-collar 29, adapted to abut against the under face of the guide-bracket 28', whereby the vertical movement of said bar 28, and hence the connected switch 27, is limited. The switch 27 will be preferably a "spring-actuated" switch. For this purpose the coiled spring 30, disposed about the bar 28 and constituting a spring-actuator, may be employed, said spring resting on the bracket 28' and bearing against the stop-collar 28" on said bar.

The switch proper or bridge-piece 27' will be normally in contact with the switch-terminals 25 and 25', whereby the electrically-connected motor M will be driven at its highest speed, it being obvious, of course, that the tendency of the spring 30 is to thrust said switch 27 upward and the part 27' out of contact with said terminals 25 and 25', respectively. This action of the switch, however, will be checked or retarded by the scale-beam B, as will now appear. Said switch 27 is shown having a projection—the pivot 27",—which connects it and the bar 28, being extended for this purpose—said projection or extended pivot carrying an antifriction-roll adapted to impinge against the counterweighted side of said scale-beam.

As the counterweighted side of the scale-beam B ascends—due to the descent of the bucket G with the mass or partial load of material therein—the circuit-controller or switch 27 will be slowly moved upward by the spring 30 and the switch proper 27' out of contact with the terminals 25 and 25' and toward the terminals 26 and 26'. At the commencement of the poising period, as indicated in Fig. 4, said switch proper 27' will have been moved into contact with the terminals 26 and 26', so that the electrical current is caused to flow through the rheostat or resistance-coil $c'$, the consequence being a material slowing down in speed of the motor M, and hence of the feeder F, whereby the latter becomes immediately effective for feeding a drip or stream of relatively small volume into the bucket G, its purpose being to complete the partial load therein. At a further point in the operation of the machine, or on the completion of a bucket load, the switch proper 27' will be thrown out of contact with the terminals 26 and 26' and the motor-circuit thereby broken, so that said motor, and hence the feeder F, may be instantly stopped.

On the stoppage of the feeder F, when the bucket load is completed, particles of the material are usually caused to drop therefrom, and for catching such particles a valve of the "scoop" type will be preferably employed, said valve being designated by 32 and pivotally supported by the extended end plates 6 and 6' of the chute H. Said valve 32 will be normally maintained in an open position or away from the path of flow of the stream of material from the feeder F, a counterweighted arm 33 being preferably employed for maintaining said valve 32 in its open position, as illustrated in Fig. 3, the weight of said arm resting on a pin or stud on the plate 6. The counterweighted arm 33 serves also as a convenient means for opening the valve 32.

For closing the valve 32 a solenoid is shown at $m$ carried by the framing of the machine, said solenoid being of the well-known character, it being provided with the usual core $m'$, operatively connected with the valve 32, so that when the said magnet $m$ is energized at the proper point in the operation of the machine it is adapted to cause the closure of the valve 32. For thus energizing the magnet a portion of the electrical current which supplies the motor may be utilized, or said magnet may be connected to a battery-circuit.

Electrical conductors or wires are shown at $y$ and $y'$ connected to the magnet $m$ and to the spring-terminals $p$ and $p'$, these connections constituting a supplemental or auxiliary circuit which is normally open, said circuit being closed at a predetermined point in the operation or on the completion of a bucket load by the scale-beam B, whereby the solenoid-magnet $m$ will be energized and the core $m'$ drawn inward, and the valve 32, through its operative connection with said core $m'$, closed. The connection between said core $m'$ and the valve 32 is shown as a link 33', pivoted, respectively, to said members.

It will be remembered that the solenoid-magnet circuit is an open one, it being closed on the completion of the bucket load by the scale-beam B. The valve 32 being open and the core $m'$ of the magnet $m$ being in its retracted position, as illustrated in Fig. 3, it will be evident that when the circuit is closed by the contact of the spring-terminals $p$ and $p'$ the magnet $m$ will be energized, whereby the core $m'$ is immediately drawn inward and the valve 32 closed or projected across the path of flow of the supply-stream. The weight W of the scale-beam B is shown having the adjustable pin 35 suitably held against movement thereon, and which is adapted to impinge against the lower terminal $p'$, forcing it into contact with the terminal $p$, which action immediately closes the supplemental circuit for effecting the results hereinbefore alluded to.

The valve 32 constitutes a convenient means for breaking the motor-circuit, it being shown connected to the switch 27 by the connecting link or rod 45. On the closure of the valve 32 in the manner previously specified the connecting-link 45 will be thrust rearward and the switch 27 moved in correspondence therewith, so that bridge-piece 27' is forced out of contact with the terminals 26 and 26', and the motor and solenoid circuits thereby broken, whereby the motor and the connected feeder F may be thereby stopped.

Means are provided for preventing the premature closure of the valve 32. The rod 10, to which reference has been hereinbefore made, is extended upward for a relatively considerable distance, and is furnished with a stop 36, consisting of a flange projecting from the inner face thereof, which coacts with a stop operative with the valve 32, said coacting stop being shown at 37 as a segmental flange formed on the lower end of the blade 37', which in turn is connected to the valve 32.

It will be understood that the rod 10 has a vertical movement, it being descendible with the bucket G, and having a further descending movement on the opening of the closers L and L', a suitable guide—as the bracket 36' on the bucket G—being preferably employed for maintaining said rod 10 against lateral movement.

On reference to Fig. 5 it will be observed that the flanges 36 and 37 are in contact, whereby the closing of the valve 32 will be positively blocked. As the bucket G descends it will be apparent that the stop 36 will move therewith, so that on the completion of the bucket load these stops may pass out of contact, whereby the valve 32 will be closed in the manner previously described.

It will be remembered that the closers L and L' have been described as normally held against movement through the medium of the latch 13, which is in engagement with the projection 10', formed on the thrust-rod 10. A device will be preferably employed for limiting the action of the latch 13, said device in the form herein shown consisting of a lever 38, pivoted to the side frame 4, the free end thereof being normally or approximately in contact with the latch-arm 39, as illustrated in Fig. 5, so that any tendency of the latch 33 to swing prematurely about its pivot will be arrested by the lever 38, by reason of the abutment of the latch-arm 39 against said lever. The latch-limiting lever 38 will be preferably connected with the valve 32, the connecting-rod 41, pivoted, respectively, to the blade 37' and to the lever 38, being shown for this purpose. It will be obvious that as the valve 32 closes the rod 41 will be raised and the lever 38 thereby caused to intersect the arc of oscillation of the latch-arm 39, whereby said latch may be tripped. For thus tripping the latch the depending rod 42, constituting a latch-tripper and operatively connected with the valve 32, is provided, said rod being projected into engagement with the latch-arm 40, succeeding the freeing of said latch and by the power of the solenoid $m$, so that said latch will be swung about its center of movement by the rod 42, and the hook 13' of said latch disengaged from the projection 10' on the rod 10. This action will free the two closers L and L' of all restraint, whereby they may be instantly forced open by the weight of the bucket contents and the latter discharged into the hopper H'.

Briefly, the operation of the hereinbefore-described weighing-machine is as follows: Fig. 3 represents the positions occupied by the respective parts at the commencement of operation, the closers L and L' being shut and maintained in such position by the counterweighted latch 13, which is in engagement with the projection 10' of the rod 10, connected to said closers, Fig. 5. The valve 32 will be in its open position and the bridge-piece 27' will be in contact with the terminals 25 and 25', whereby a current will be established to operate the motor M and through the latter the feeder F. The current being of relatively high amperage, the feeder will be driven at a relatively high velocity and is operable for supplying a stream of large volume to the bucket G, such stream being conveyed thereto from the chute or hopper. When a certain proportion of the load is received by the bucket, it will descend, the counterweighted side of the beam B ascending and moving away from the projection 27'', the switch 27 will be moved upward through the intervention of the coiled spring 30. At the commencement of the poising period, as illustrated in Fig. 4, the switch proper or bridge-piece 27' has been moved out of contact with the terminals 25 and 25' and into contact with the terminals 26 and 26', which are connected with a resistance-coil $c'$, the current thereby flowing through said resistance-coil and to the motor M, and being of relatively lower amperage, the consequence will be a slowing down in speed of said motor and hence the feeder F, whereby the latter is adapted to feed a stream of relatively small volume into the bucket G to complete the bucket load. On the completion of such load the counterweight of the scale-beam will have a further ascending movement and will move into contact with the spring-terminal $p'$, so that it will be forced against its mate $p$ and the solenoid-magnet $m$ energized. When this takes place, said solenoid-magnet draws its core $m'$ inward, thereby instantly closing the valve 32. As the valve closes it is adapted for swinging the switch 27 rearward through the connecting-rod 45, whereby the bridge-piece 27' is moved out of contact with the terminals 26' and 26'', as indicated in Fig. 6, the result being a stoppage of the motor M and the connected feeder F. Succeeding this operation the rod 42, which is connected with the valve 32, will be carried into contact with the latch-arm 40, thereby swinging said latch about its axis and releasing the rod 10 and also the closers L and L', whereby they may be instantly forced open by the weight of the bucket contents, as illustrated in Fig. 6.

Having described my invention, I claim—

1. The combination with weighing mechanism embodying a bucket, of a feeder; an electric circuit having a motor therein, said motor being operable for actuating said feeder; and a circuit-controller governed by said weighing mechanism.

2. The combination with a scale-beam and a bucket supported thereby, of a feeder; an electric circuit having a motor therein, said motor being operable for actuating said feeder; and a circuit-controller governed by said scale-beam.

3. The combination with weighing mechanism embodying a bucket, of a feeder; an electric circuit having a motor therein, said motor being operable for actuating said feeder; and a spring-actuated circuit-controller governed by said weighing mechanism.

4. The combination with weighing mechanism embodying a bucket, of a feeder; an electric circuit having a motor therein, said motor being operable for actuating said feeder; a switchboard having terminals thereon also located in said circuit; and a switch adapted to bridge said terminals, said switch being controlled by the weighing mechanism.

5. The combination with a feeder, of an electric circuit having a motor therein, said motor being operable for actuating said feeder; a switchboard having terminals also located in said circuit; a switch adapted to bridge said terminals; and a valve operatively connected to said switch.

6. The combination with weighing mechanism embodying a bucket, of a feeder; an electric circuit having a motor therein, said motor being operable for actuating said feeder; a switchboard having terminals thereon also located in said circuit; and a laterally-movable switch adapted to bridge said terminals, said switch being controlled by the weighing mechanism.

7. The combination with weighing mechanism embodying a bucket, of a feeder; an electric circuit having a motor therein, said motor being operable for actuating said feeder; a switchboard having thereon two sets of terminals; and a switch adapted to bridge either of said sets of terminals to thereby complete an electric circuit, said switch being controlled by the weighing mechanism.

8. The combination with weighing mechanism, of a feeder; an electric circuit having a motor therein, said motor being operable for actuating said feeder; an electric generator; and means governed by said weighing mechanism for varying the strength of the current supplied to said motor.

9. The combination with weighing mechanism, of a feeder; an electric circuit having a motor therein, said motor being operable for actuating said feeder; a switchboard having terminals thereon also located in said circuit; and a pair of coöperative bars, one of which is provided with a switch for bridging said terminals, the other bar being governed by the weighing mechanism.

10. The combination with weighing mechanism, of a feeder; an electric circuit having a motor therein, said motor being operable for actuating said feeder; a switchboard having terminals thereon also located in said circuit; a pair of coöperative bars, one of which has a switch for bridging said terminals; and means for actuating the other bar.

11. The combination with weighing mechanism, of a feeder; an electric circuit having a motor therein, said motor being operable for actuating said feeder; a switchboard having terminals thereon also located in said circuit; a pair of pivotally-connected bars, one of which is provided with a switch for bridging said terminals; means for actuating the other bar; and a valve operatively connected to one of said bars.

12. The combination with weighing mechanism, of a feeder; an electric circuit having a motor therein, said motor being operable for actuating said feeder; a switchboard having thereon terminals also located in said circuit; a bar having a switch adapted to bridge said terminals; a second bar provided with a switch-actuator disposed about the same; and a valve operatively connected with said first-mentioned bar.

13. The combination with weighing mechanism, of a feeder; an electric circuit having a motor therein, said motor being operable for actuating said feeder; a switchboard having thereon terminals also located in said circuit; a bar having a switch adapted to bridge said terminals; a second bar pivoted to said first-mentioned bar; a valve; and a rod operatively connected to said valve and first-mentioned bar.

14. The combination with a scale-beam and with a bucket supported thereby, of a feeder; an electric circuit having a motor therein, said motor being operable for actuating said feeder; a switchboard having terminals also located in said circuit; a switch having means connected thereto for moving the same out of contact with said terminals and having thereon a projection adapted to bear against said scale-beam, by which said scale-beam is limited.

15. The combination with weighing mechanism embodying a bucket, of a feeder; an electric circuit having a motor therein, said motor being operable for actuating the feeder; a solenoid; a valve operated by said solenoid; and means for controlling the current supplied, respectively, to the motor and solenoid, said means being governed by the weighing mechanism.

16. The combination with a bucket and with a scale-beam for supporting the same, of a feeder; an electric circuit having a motor therein, said motor being operable for actuating the feeder; a switchboard having two sets of terminals in said circuit; a valve; a solenoid also located in said circuit and adapted to operate said valve; and circuit-controlling means governed by said scale-beam.

17. The combination with a bucket and with a scale-beam for supporting the same, of an electric circuit having a motor therein, said motor being operable for actuating said feeder; a switch located in said circuit and having two sets of terminals; a switch controlled by the scale-beam and adapted to bridge either of said sets of terminals; a valve; a solenoid adapted to operate said valve; and a pair of terminals, one of which is operated by the scale-beam, whereby they are caused to come in contact.

18. The combination with a bucket having a closer, of stream-supply means; a valve having a stop; a rod connected to the closer, said rod being provided with an offset against which the valve-stop member is adapted to bear normally; a latch located to engage a projection on said rod; and a lever normally operative for limiting the movement of said latch, said lever being connected to the valve-stop member.

19. The combination with a bucket having a closer, of stream-supply means; a valve having a stop member; a rod connected to the closer and provided with an offset against which said stop member is adapted to bear normally; a latch located to engage a projection on said rod; a lever normally operative for limiting the movement of said latch, said lever being operatively connected to said member; and a latch-tripping device attached to said valve.

20. The combination with a bucket having a closer, of means embodying a latch for holding said closer against movement, said latch having a pair of arms; a lever normally approximately in contact with one of said arms; means for operating said lever; and a tripping device operable for engaging the other arm of said latch to thereby trip said latch.

21. The combination with a bucket having a closer, of means embodying a latch for holding said closer against movement, said latch having a pair of arms; a valve having a lever operatively connected thereto and in position to approximately engage one of said latch-arms; and a tripping device connected to said valve and operable for engaging the other arm of said latch.

22. The combination with a bucket having a closer, of means embodying a latch for holding said closer against movement; a scale-beam for supporting said bucket; a valve having a latch-tripping device; a solenoid for actuating said valve; and means operated by said scale-beam for energizing said magnet.

23. The combination with a bucket and with a valve, of a closer for said bucket; a relatively long rod connected to said closer and normally held against movement, said rod having a stop; and a coacting stop operative with said valve and normally bearing against said first-mentioned stop.

24. The combination with a bucket having a pair of closers, of a rod operatively connected to said closers by links, said rod having a projection and provided also with a stop; a latch having a hook adapted to engage said projection; a valve having a stop normally bearing against said first-mentioned stop; and a latch-tripping device.

FRANCIS H. RICHARDS.

Witnesses:
FRED. J. DOLE,
F. N. CHASE.